(12) United States Patent
Zhao

(10) Patent No.: US 12,374,749 B2
(45) Date of Patent: Jul. 29, 2025

(54) END INSULATING PLATE, BATTERY DEVICE AND ASSEMBLING METHOD OF BATTERY DEVICE

(71) Applicant: CALB Co., Ltd., Jiangsu (CN)

(72) Inventor: Dong Zhao, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 589 days.

(21) Appl. No.: 17/945,009

(22) Filed: Sep. 14, 2022

(65) Prior Publication Data

US 2023/0268602 A1    Aug. 24, 2023

(30) Foreign Application Priority Data

Feb. 21, 2022 (CN) .......................... 202210155036.1

(51) Int. Cl.
*H01M 50/291* (2021.01)

(52) U.S. Cl.
CPC ................... *H01M 50/291* (2021.01)

(58) Field of Classification Search
CPC .................................................. H01M 50/289
See application file for complete search history.

(56) References Cited

U.S. PATENT DOCUMENTS

| 2016/0020448 | A1* | 1/2016 | Iqbal | ................. | H01M 50/358 |
| | | | | | 429/50 |
| 2017/0062781 | A1 | 3/2017 | Kim | | |
| 2022/0294047 | A1* | 9/2022 | Pethick | ............... | H01M 50/227 |

FOREIGN PATENT DOCUMENTS

| CN | 109203562 | | 1/2019 | | |
| CN | 209447881 | | 9/2019 | | |
| CN | 112421161 | | 2/2021 | | |
| CN | 112421161 | A * | 2/2021 | | |
| CN | 216773394 | | 6/2022 | | |
| WO | WO-2021150847 | A1 * | 7/2021 | ......... | H01M 50/293 |
| WO | 2021206278 | | 10/2021 | | |

OTHER PUBLICATIONS

"Search Report of Europe Counterpart Application", issued on Oct. 10, 2023, p. 1-p. 5.
"Office Action of China Counterpart Application", issued on Oct. 27, 2023, with English translation thereof, p. 1-p. 9.

* cited by examiner

*Primary Examiner* — Maria Laios
(74) *Attorney, Agent, or Firm* — JCIP GLOBAL INC.

(57) ABSTRACT

An end insulating plate is arranged in a battery device to insulate a battery apparatus. The end insulating plate has a glue baffle disposed at a bottom portion, is bendable, and has first and second states. In the first and second states, the glue baffle is bent towards a first larger surface of the end insulating plat, which is the larger surface at a side of the end insulating plate facing away from the battery apparatus. In the first state, the glue baffle is bent at a first inclination angle. In the second state, the glue baffle is bent at a second inclination angle. The first inclination angle is greater than the second inclination angle. When bending of the glue baffle is changed from the first inclination angle to the second inclination angle, the glue baffle pushes glue away from the bottom portion of the end insulating plate.

22 Claims, 11 Drawing Sheets

END INSULATING PLATE, BATTERY DEVICE AND ASSEMBLING METHOD OF BATTERY DEVICE

CROSS-REFERENCE TO RELATED APPLICATION

This application claims the priority benefit of China application serial no. 202210155036.1, filed on Feb. 21, 2022. The entirety of the above-mentioned patent application is hereby incorporated by reference herein and made a part of this specification.

BACKGROUND

Technical Field

The disclosure relates to the technical field of batteries, and in particular, relates to an end insulating plate, a battery device, and an assembling method of the battery device.

Description of Related Art

In the assembly process of the battery device, the two ends of each battery apparatus are generally glued to the end insulating plates, and the battery apparatus is then put into the case body. Further, before the battery apparatus with end insulating plates glued thereto at both ends is placed in to the case body, glue is coated on the end insulating plates and/or beams, so that the battery apparatus placed in the case body and the beams are glued and fixed. However, when the battery apparatus is put into the case body, the glue coated in advance may be scratched off and glued to other positions. As such, the gluing strength after coating and curing is not high, and/or the end insulating plate is not assembled in place, etc., which directly affects the assembly yield of the battery device and is not conducive to industrial production.

SUMMARY

The disclosure provides an end insulating plate, a battery device, and an assembling method of the battery device.

In the first aspect, the disclosure provides an end insulating plate, and the end insulating plate is adapted to be arranged in a battery device to insulate a battery apparatus from other components. The end insulating plate includes a glue baffle disposed at a bottom portion of the end insulating plate. The glue baffle is bendable and at least has a first state and a second state. In the first state and the second state, the glue baffle is bent towards a side of a first larger surface of the end insulating plate. The first larger surface is a larger surface at a side of the end insulating plate facing away from the battery apparatus. In the first state, the glue baffle is bent at a first inclination angle relative to the first larger surface of the end insulating plate. In the second state, the glue baffle is bent at a second inclination angle relative to the first larger surface of the end insulating plate. The first inclination angle is greater than the second inclination angle. When bending of the glue baffle is changed from the first inclination angle to the second inclination angle, the glue baffle is configured to push glue on the bottom portion of the end insulating plate in a direction away from the bottom portion of the end insulating plate.

In the second aspect, the disclosure further provides a battery device. The battery device includes a beam, a battery apparatus, and the end insulating plate as described above. The beam forms a chamber, and the end insulating plate and the battery apparatus are arranged in the chamber. The end insulating plate is arranged between the beam and the battery apparatus, and the first larger surface of the end insulating plate faces the beam. The glue baffle is in the second state.

In the third aspect, the disclosure provides an assembling method of a battery device. The method includes the following steps.

A case body of the battery device is provided. A beam is arranged in the case body, the beam forms a chamber, and glue is arranged at an angle formed by the beam and a bottom plate of the case body. A clamping tool presses a battery apparatus and an end insulating plate and puts the battery apparatus and the end insulating plate into the chamber. The end insulating plate is arranged between the beam and the battery apparatus, and a first larger surface of the end insulating plate faces the beam. A bottom portion of the end insulating plate is provided with a glue baffle. The glue baffle is bendable and at least has a first state and a second state. In the first state and the second state, the glue baffle is bent towards the first larger surface of the end insulating plate. In the first state, the glue baffle is bent at a first inclination angle relative to the first larger surface of the end insulating plate. In the second state, the glue baffle is bent at a second inclination angle relative to the first larger surface of the end insulating plate. The first inclination angle is greater than the second inclination angle. In a process from the glue baffle of the end insulating plate contacting the bottom plate of the case body to the battery apparatus being assembled in place, the glue baffle pushes the glue between the end insulating plate and the beam when the glue baffle changes from the first state to the second state by pressing of the bottom plate of the case body.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

Figure 1:
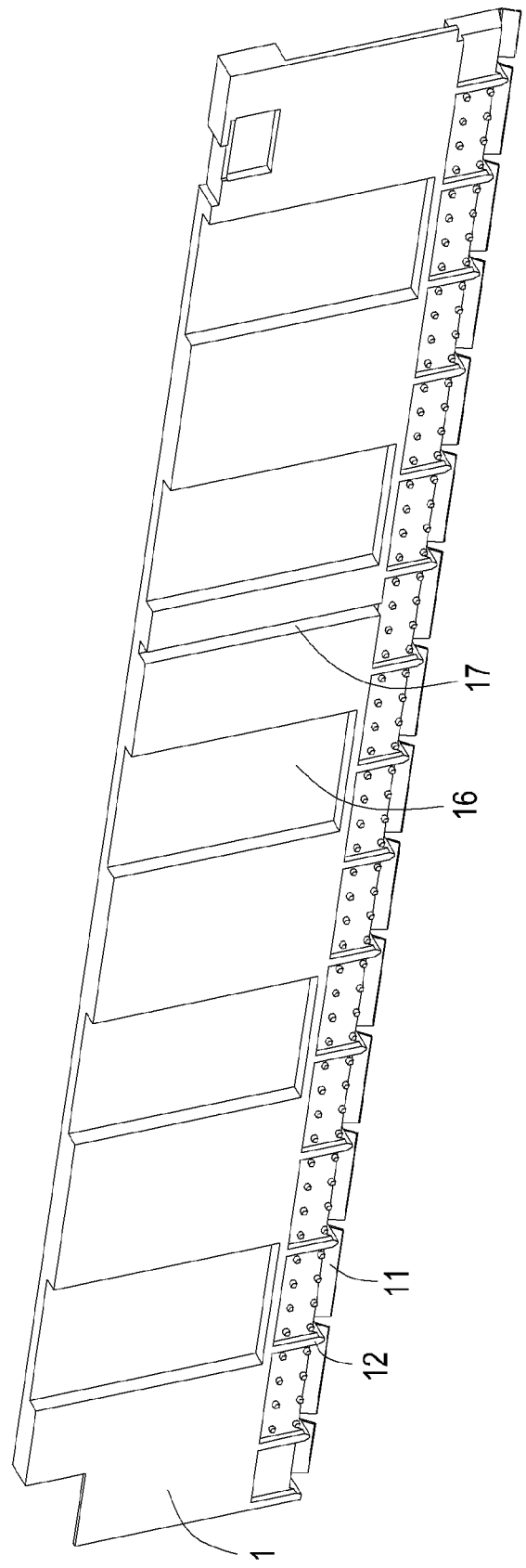
FIG. 1 is a schematic view of a partial structure of an end insulating plate according to an embodiment of the disclosure.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

In the related art, in a battery pack, the beam forms a chamber in the case body, and the battery apparatus is directly inserted into the chamber surrounded by the beam. Generally, in order to improve insulation performance, avoid damage to the batteries, and reduce friction, end insulating plates are provided at both ends of the battery apparatus. In this way, if glue is not coated between the end insulating plates and the beam, the battery apparatus may be easily displaced or may be easily separated from the chamber due to vibration and other reasons during use of the battery pack, causing danger. If the end insulating plates are put into the chamber after glue is coated thereon, when the end insulating plates enter the chamber, the glue may be scratched off and glued to other positions. The amount of glue being actually applied is thereby reduced, the glue is not be evenly applied, and the batteries may not be stably fixed. Further, the process of transferring the end insulating plates and the battery apparatus into the chamber requires a clamping tool to clamp the end insulating plates, such that the glue coated on the end insulating plates may contaminate the clamping tool.

In view of the above, the disclosure provides a technical solution in which glue is coated at the corner between the beam and the bottom plate and the beam and the end insulating plates of the battery apparatus are glued through overflowing, and in this way, the assembly yield of the battery apparatus may be improved, the fixing strength of the battery apparatus may be enhanced, and the yield of the battery device as a whole may be increased.

Figure 4:
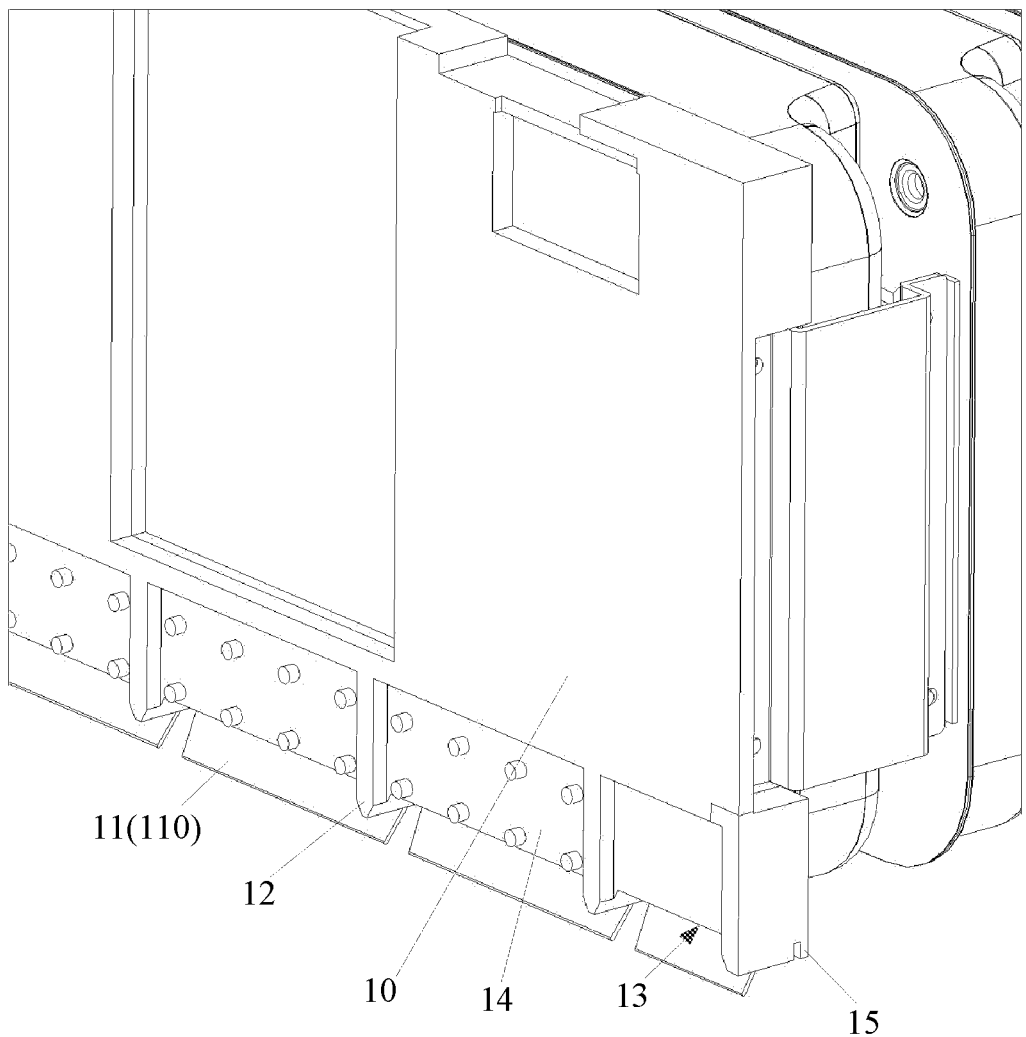
FIG. 4 is a schematic view of a partial structure of the battery apparatus when the end insulating plate is in a first state according to an embodiment of the disclosure.
Figure 5:
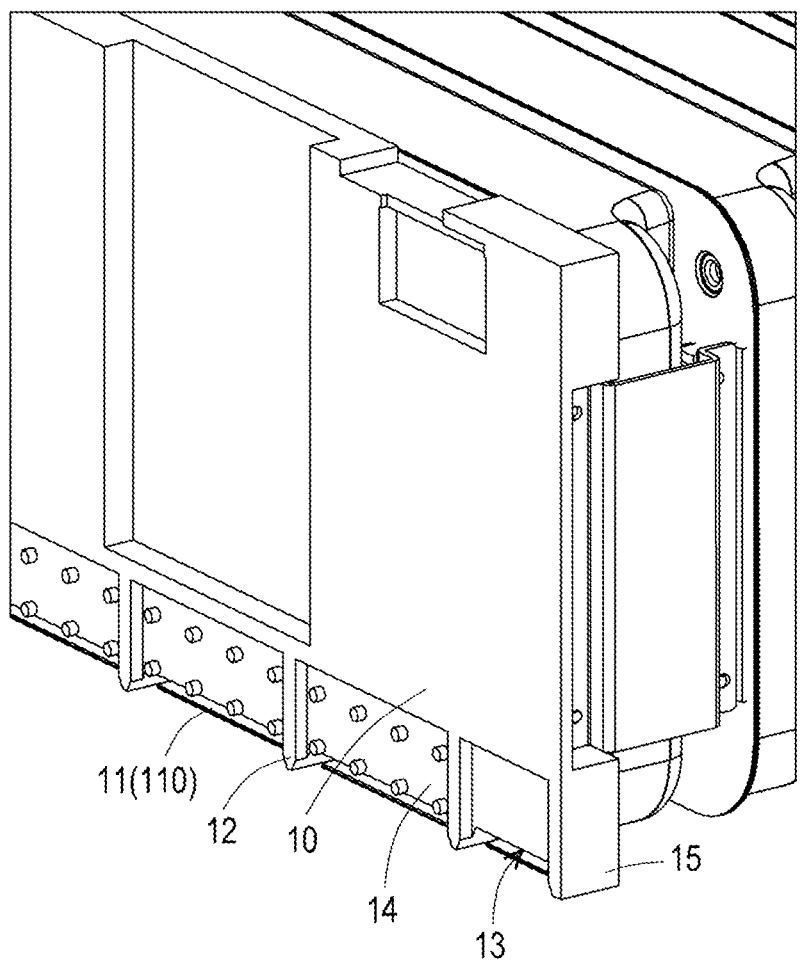
FIG. 5 is a schematic view of a partial structure of the battery apparatus when the end insulating plate is in a second state according to an embodiment of the disclosure.
Figure 6:
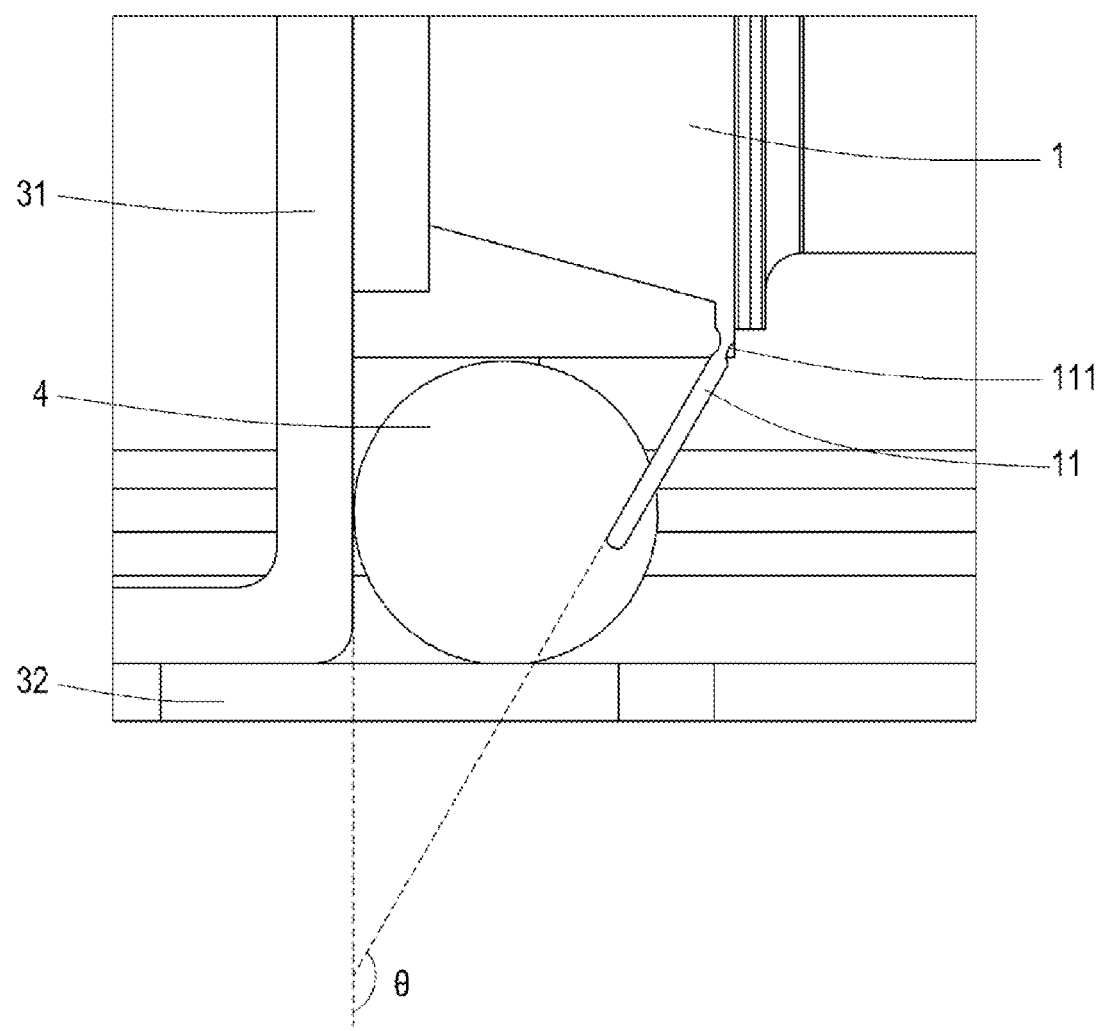
FIG. 6 is a schematic cross-sectional view of a partial structure of the battery apparatus in an assembly process when the end insulating plate is in the first state according to an embodiment of the disclosure.
Figure 7:
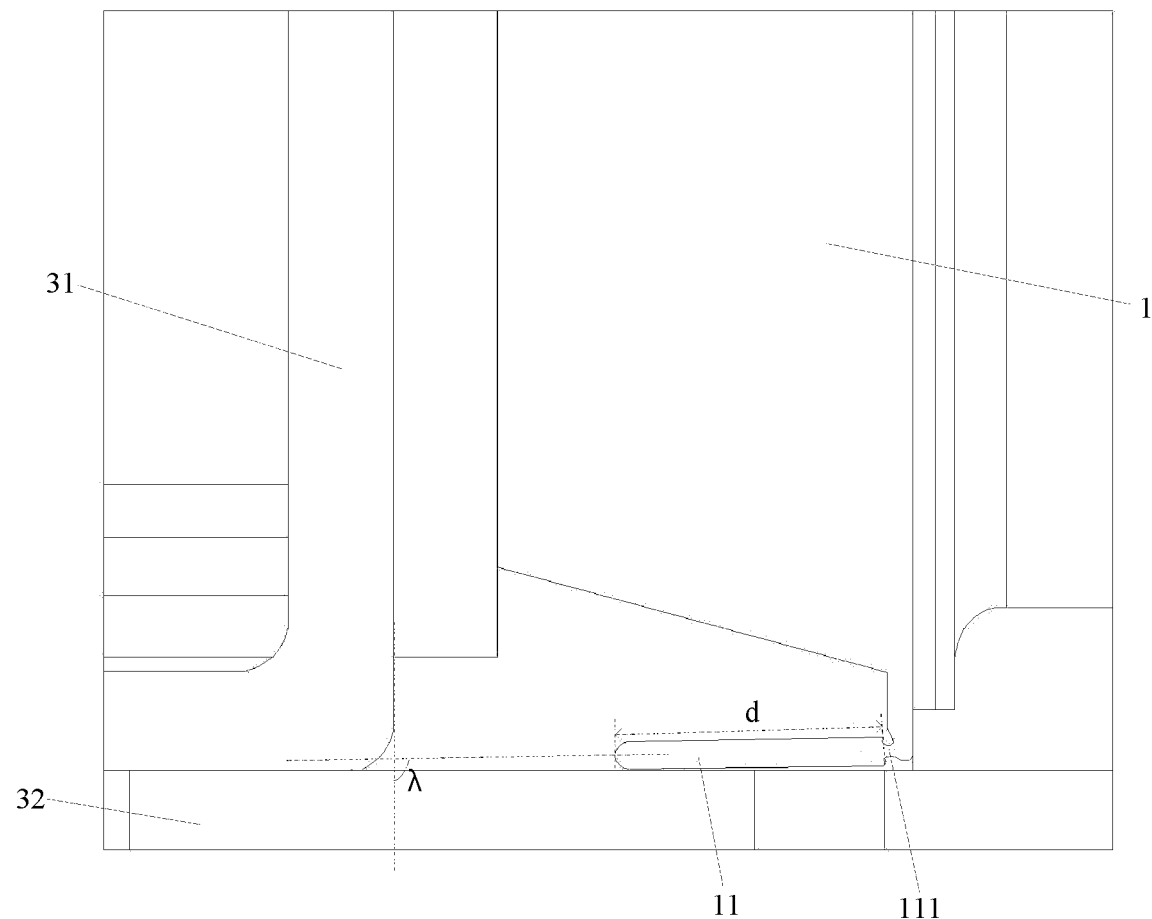
FIG. 7 is a schematic cross-sectional view of a partial structure of the battery apparatus being assembled in place when the end insulating plate is in the second state according to an embodiment of the disclosure.

In the first aspect, the disclosure provides an end insulating plate, and the end insulating plate is arranged in a battery device to insulate a battery apparatus from other components. As shown in FIG. 1, FIG. 2, FIG. 3, FIG. 4, FIG. 5, FIG. 6, and FIG. 7, a bottom portion of an end insulating plate 1 is provided with a glue baffle 11. The glue baffle 11 is bendable and at least has a first state and a second state. In the first state and the second state, the glue baffle 11 is bent towards a side of the first larger surface 10 of the end insulating plate 1. The first larger surface 10 is the larger surface at a side of the end insulating plate 1 facing away from the batteries. In the first state, as shown in FIG. 4 and FIG. 6, the glue baffle 11 is bent at a first inclination angle $\theta$ relative to the first larger surface 10 of the end insulating plate 1. In the second state, as shown in FIG. 5 and FIG. 7, the glue baffle 11 is bent at a second inclination angle $\lambda$ relative to the first larger surface 10 of the end insulating plate 1. The first inclination angle $\theta$ is greater than the second inclination angle $\lambda$. When bending of the glue baffle 11 is changed from the first inclination angle $\theta$ to the second inclination angle $\lambda$, the glue baffle is configured to push glue 4 on the bottom portion of the end insulating plate 1 in a direction away from the bottom portion of the end insulating plate 1.

Figure 9:
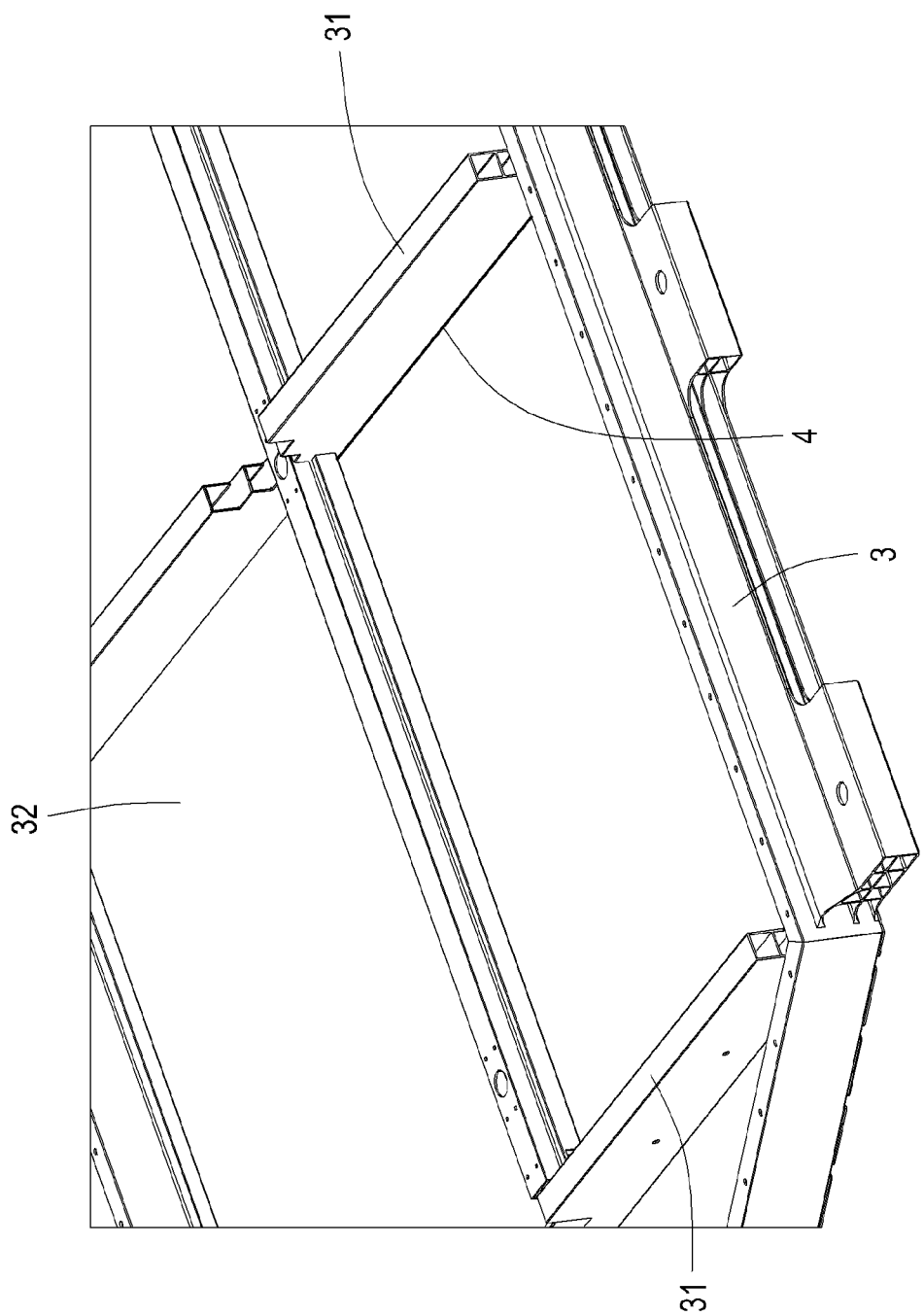
FIG. 9 is a schematic diagram of a partial structure of a case body of a battery device according to an embodiment of the disclosure.
Figure 10:
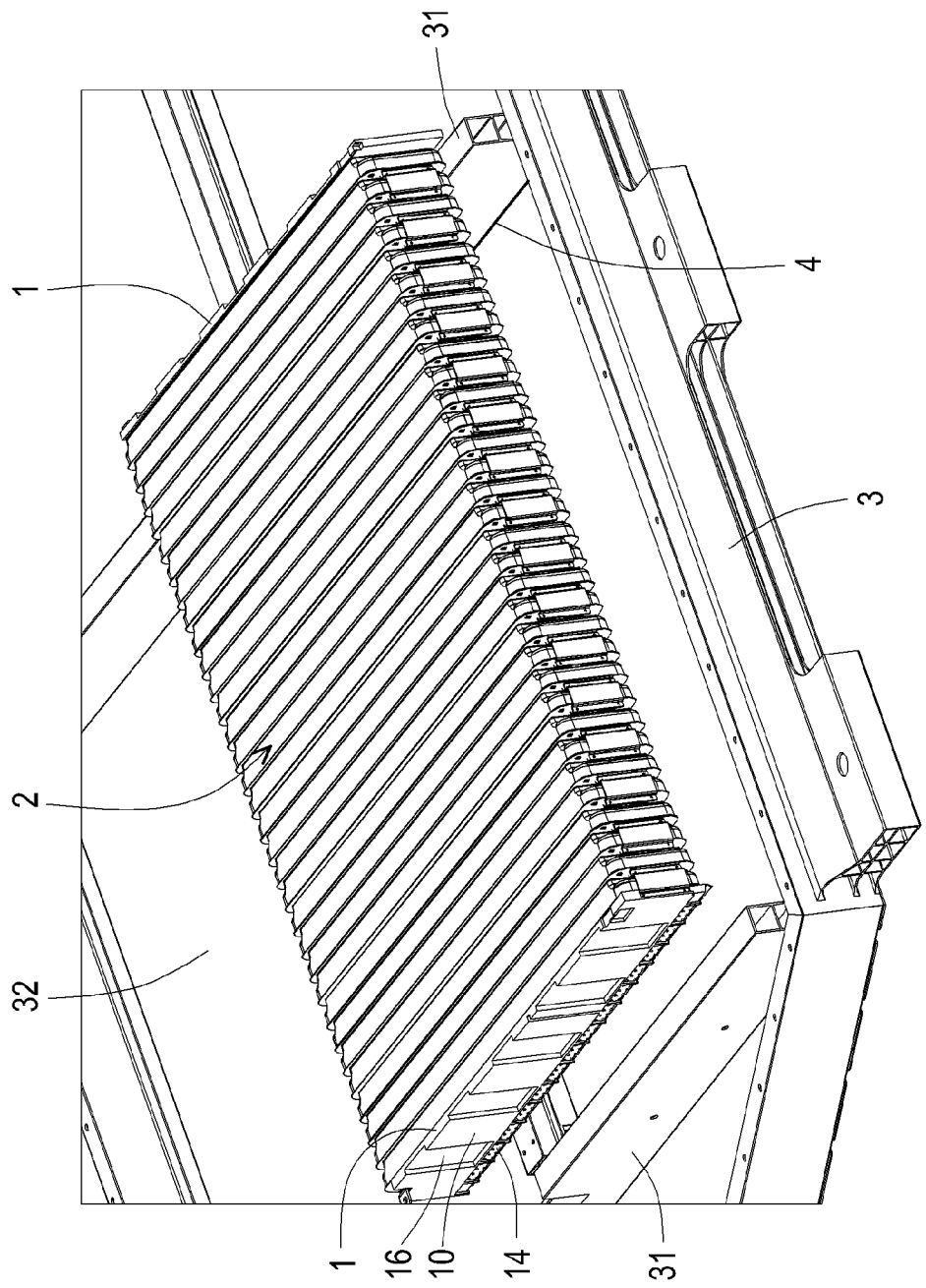
FIG. 10 is a schematic view of a structure of a battery apparatus being put into a case in the battery device according to an embodiment of the disclosure.
Figure 11:
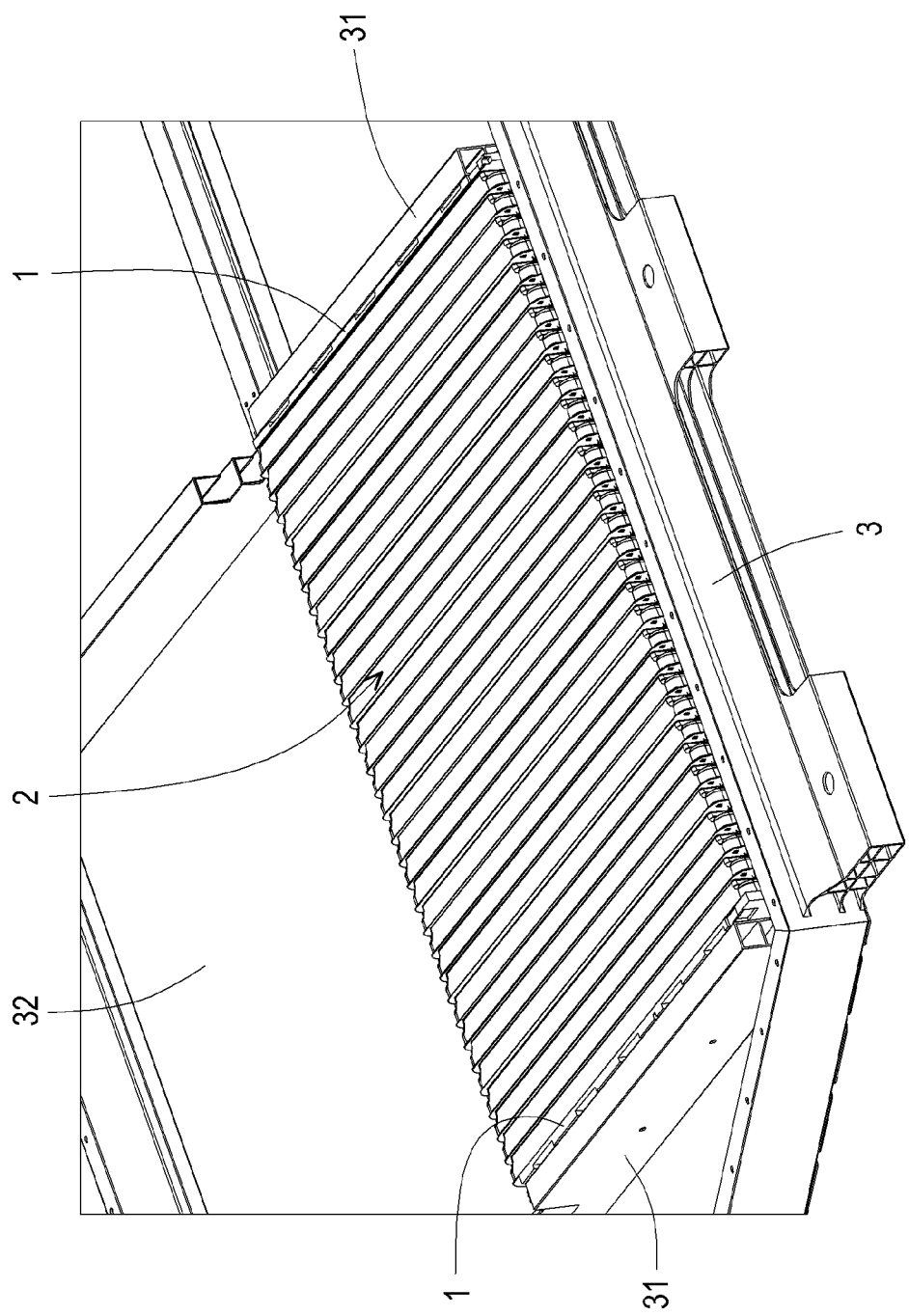
FIG. 11 is a schematic view of a structure of the battery apparatus being put into the case and assembled in place in the battery device according to an embodiment of the disclosure.

As shown in FIG. 9, FIG. 10, and FIG. 11, the end insulating plate 1 provided by the disclosure may be arranged at a peripheral side of a battery apparatus 2. The battery apparatus 2 and the end insulating plate 1 are assembled in a case body 3 of the battery device together to form the battery device. A beam 31 is provided in the case body 3 of the battery device. The beam 31 forms a chamber, and the battery apparatus 2 is arranged in the chamber. The end insulating plate 1 is arranged between the battery apparatus 2 and the beam 31 in the case body 3 and is glued to the beam 31.

In this embodiment, the bottom portion of the end insulating plate 1 is provided with the glue baffle 11, and the glue baffle 11 may be bent to be changed between the first state and the second state. As such, when the end insulating plate 1 and the battery apparatus 2 are assembled into the case body 3 of the battery device, glue is not required to be coated on an entire gluing surface (i.e., the first larger surface 10) of the end insulating plate 1 in advance, and only some glue 4 is required to be placed at a vertical corner formed by a bottom plate 32 of the case body 3 and the beam 31. In this way, with reference to FIG. 6 and FIG. 7, in a process from the glue baffle 11 of the end insulating plate 1 contacting the bottom plate 32 of the case body 3 to assembly in place, by pressing of the bottom plate of the case body 2, the glue baffle 11 changes from the first state to the second state, and then push the glue 4 at the corner between the end insulating plate 1 and the beam 31. In this way, the glue is pressed and overflows, so that improved gluing strength is provided after the glue is coated and cured, and an improved gluing effect is provided between the end insulating plate 1 and the beam 31. Further, since the glue 4 is directionally driven by the glue baffle 11, the glue 4 may not overflow easily or may not be scratched off and glued to other positions. Therefore, an amount of the glue which is actually applied may be prevented from being reduced, a favorable gluing effect is provided, and an assembly yield of the battery device is prevented from being affected. For instance, the end insulating plate 1 is prevented from not being assembled in place after the end insulating plate 1 rebounds after being pressed. As described above, through the end insulating plate 1 provided by the disclosure, the assembly yield of the battery device may be increased, which is beneficial to industrial production.

Figure 2:
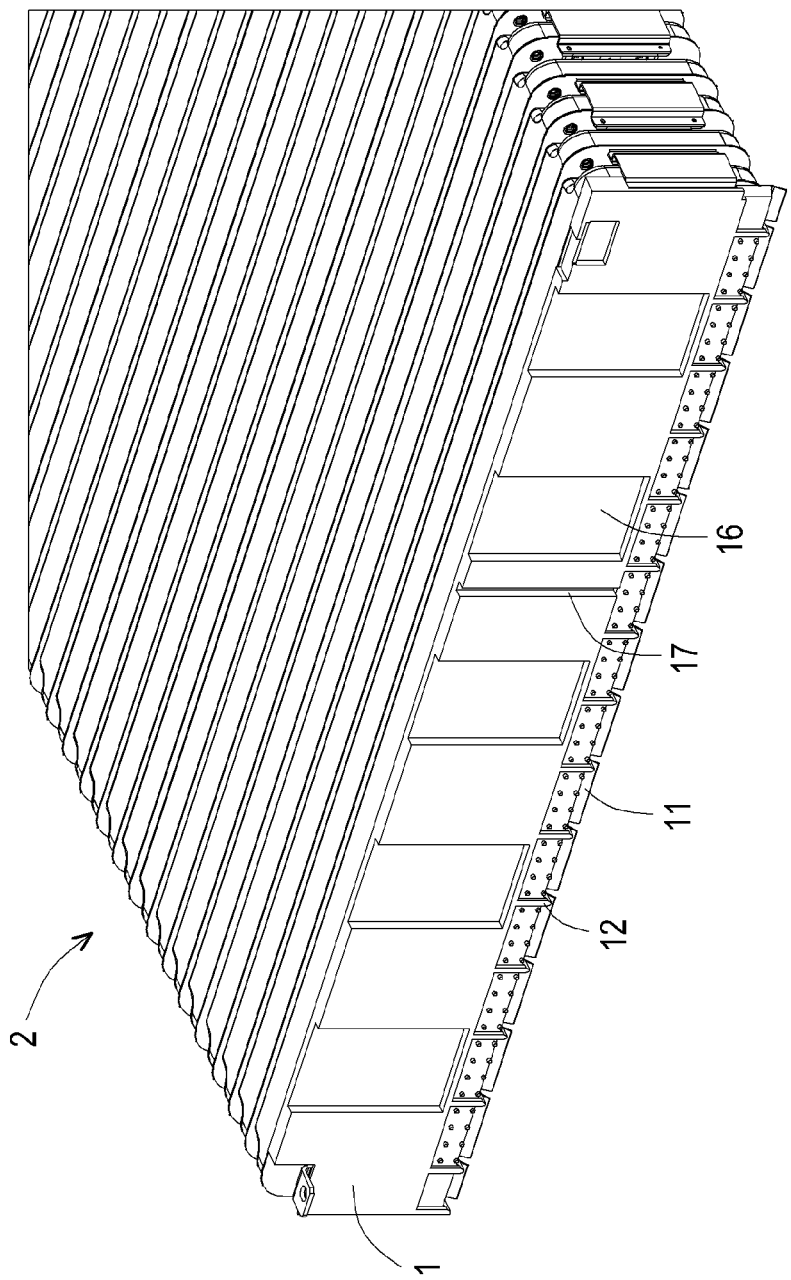
FIG. 2 is a schematic view of a partial structure of a battery apparatus adopting the end insulating plate according to an embodiment of the disclosure.
Figure 3:
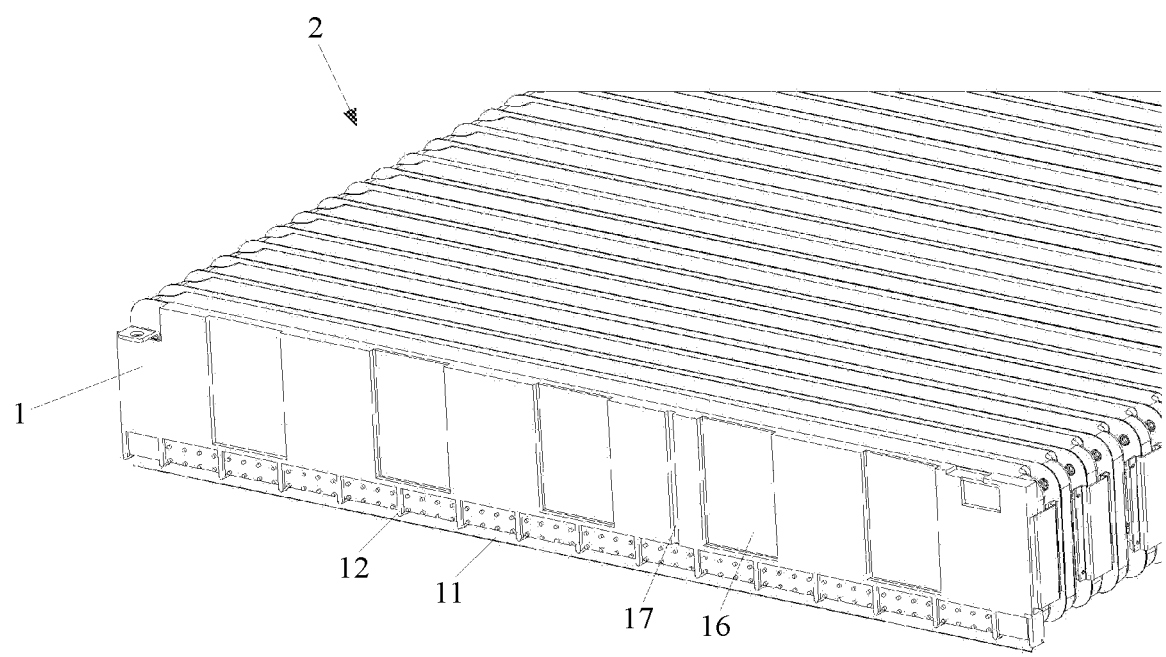
FIG. 3 is a schematic view of a partial structure of the battery apparatus adopting the end insulating plate according to another embodiment of the disclosure.

To be specific, as shown in FIG. 1, FIG. 2, and FIG. 3, the conventional end insulating plate 1 is approximately square in shape and has six side surfaces, specifically a top surface, a bottom surface, and four side surfaces. The four side surfaces include two larger surfaces, that is, the two side surfaces with the largest area. The two larger surfaces of the end insulating plate 1 are substantially perpendicular to an arrangement direction of batteries in the battery apparatus 2 and are substantially parallel to larger surfaces of the batteries. One larger surface of the end insulating plate 1 is arranged towards the plurality of batteries arranged in sequence and is glued to the end battery. The other larger surface of the end insulating plate 1, that is, the first larger surface 10, is disposed away from the battery apparatus 2 and acts as a gluing surface for being glued to the beam. The glue baffle 11 is a plate body extending from a lower part of a main body portion of the end insulating plate 1. The process in which the glue baffle 11 changes from the first state to the second state is a process in which the glue baffle 11 is gradually bent towards the first larger surface 10. In this process, the glue may be pushed to move between the first larger surface 10 and the beam, so that the glue may be pressed and overflows.

Exemplarily, as shown in FIG. 4 and FIG. 6, when the glue baffle 11 is in the first state, the glue baffle 11 is bent towards a side of the first larger surface 10 and is bent at the first inclination angle θ relative to the first larger surface 10. In this way, the glue baffle 11 keeps bending towards a side of the first larger surface 10 to reach the second state after the glue baffle 11 abuts against the bottom plate 32 of the case body. The first state may be treated as an initial state of the glue baffle 11, that is, when the end insulating plate 1 is prepared and formed, the glue baffle 11 is in the first state.

In some embodiments, as shown in FIG. 6 and FIG. 7, the first inclination angle θ is 135° to 170°, and preferably 140° to 160°. The second inclination angle λ may be 85° to 95°, and preferably 90°, that is, the glue baffle 11 is approximately perpendicular to the first larger surface 10 when being in the second state.

In some embodiments, as shown in FIG. 4 and FIG. 5, the bottom portion of the end insulating plate 1 is provided with a first groove 13. The glue baffle 11 is arranged in the first groove 13, and the first groove 13 is configured to accommodate the glue baffle 11 in the second state. When the battery apparatus is assembled in the case body, a side wall of the first groove 13 may abut against the bottom plate of the case body for supporting the end insulating plate 1. At this time, the glue baffle 11 is in the second state and is completely accommodated in the first groove 13. In this way, the supporting and positioning of the end insulating plate 1 may not be affected, the assembly and positioning effects of the battery apparatus may be improved, and the assembly yield may be increased.

In some embodiments, as shown in FIG. 4 and FIG. 5, the end insulating plate 1 is provided with a glue overflowing groove 14 arranged at a side of the first larger surface 10. The glue overflowing groove 14 is adjacent to the bottom portion of the end insulating plate 1, and a side of the glue overflowing groove 14 facing the bottom portion of the end insulating plate 1 has an opening. The glue baffle 11 is configured to push the glue towards the opening of the glue overflowing groove 14.

When the battery apparatus is put in a case in place, the glue may be pressed into the glue overflowing groove 14 along the opening below the glue overflowing groove 14. The glue overflowing groove 14 may be used for accommodating and guiding. As the glue overflowing groove 14 acts as a glue overflowing region, the arrangement of the glue overflowing groove 14 may further prevent the glue from overflowing, being scratched off, or being glued to other positions, so that assembly yield of the battery device is not affected.

Exemplarily, as shown in FIG. 1, FIG. 2, FIG. 3, FIG. 4, and FIG. 5, the bottom portion of the end insulating plate 1 is provided with a support rib 12, and the support rib 12 extends into the glue overflowing groove 14. The support rib 12 is arranged on the bottom portion of the end insulating plate 1, and a contact area between the support rib 12 and the bottom plate of the case body is smaller when the battery device is assembled. As such, the support rib 12 is less affected by a glue layer on a bottom portion of the battery apparatus 2 and may directly contact the bottom plate of the battery device. The end insulating plate 1 may thus be well supported and fixed and may be precisely assembled and positioned, and the assembly yield of the battery device is thus increased. Besides, a thickness of the end insulating plate 1 at the position of the glue overflowing groove 14 is relatively thin. By extending the support rib 12 into the glue overflowing groove 14, strength of the end insulating plate 1 at the position of the glue overflowing groove 14 may be enhanced, and reliability of the entire end insulating plate 1 is further improved. Moreover, through the arrangement of the support rib 12, the guiding and pressing effect of the glue may be improved, the glue may enter the glue overflowing groove 14 along the support rib 12, and gluing strength is also enhanced.

In some embodiments, as shown in FIG. 1, FIG. 2, FIG. 4, and FIG. 5, the glue baffle 11 includes a plurality of plate bodies 110 arranged at intervals, and the support rib 12 is arranged between adjacent plate bodies 110.

To be specific, the glue baffle 11 is arranged in a length direction of the bottom surface of the end insulating plate 1 and is in a shape of a long and narrow strip. The glue baffle 11 is configured to be formed by the plate bodies 110, so that the glue baffle 11 may be easily formed without affecting the assembly. During assembly, the glue at the bottom portion of the end insulating plate 1 may enter into the glue overflowing groove 14 through a gap between the plate bodies 110, and the glue and fixing effects are improved in this way. Further, by arranging the support ribs 12 among the plate bodies 110, the supporting and positioning effects of the battery apparatus 2 in the case body of the battery device may be improved, which is conducive to the overflowing of glue and improves the assembly yield of the battery device.

Figure 8:
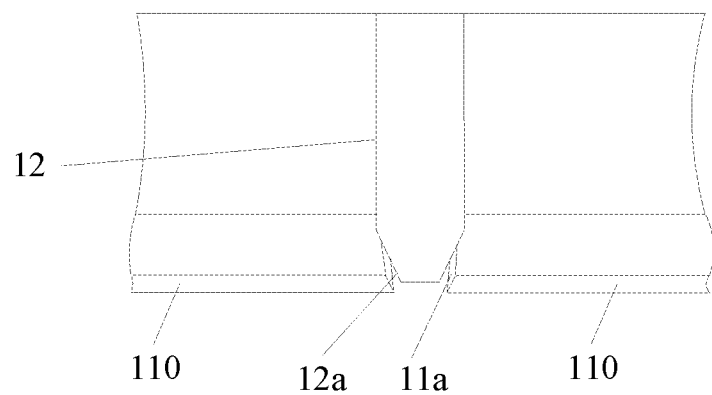
FIG. 8 is a schematic view of a partial structure of the end insulating plate according to an embodiment of the disclosure.

Exemplarily, as shown in FIG. 8, a bottom portion of the support rib 12 is provided with two first chamfers 12a respectively facing the adjacent plate bodies 110 at two sides. By arranging the first chamfers 12a on the support rib 12, a contact area between the support rib 12 and the bottom plate of the case body may be further reduced, the support rib 12 may directly contact the bottom plate, the supporting and positioning of the end insulating plate 1 may be less affected by the glue layer of the bottom portion, the supporting and positioning effects of the end insulating plate 1 in the assembly process may be improved, the glue is allowed to smoothly flow to the glue overflowing groove, and the gluing strength is enhanced.

Further, as shown in FIG. 8, a side edge of each plate body 110 adjacent to the support rib 12 is provided with a second chamfer 11a matched with the corresponding first chamfer 12a of the support rib 12. To be specific, the matching of the first chamfer 12a and the second chamfer 11a means that a shape of an inclined surface formed by the first chamfer 12a and a shape of an inclined surface formed by the second chamfer 11a are complementary. For instance, the inclined surface formed by the first chamfer 12a is a plane inclined downwards, and the inclined surface formed by the second chamfer 11a is a plane inclined upwards. Alternatively, the inclined surface formed by the first chamfer 12a is a concave are surface, and the inclined surface formed by the second chamfer 11a is a convex are surface. In this way, the glue baffle 11 may be easily assembled in place, the gap between the plate bodies 110 and the support rib 12 may be reduced, glue leakage may be avoided, and the effects of glue baffling and glue overflowing may be improved.

In some embodiments, the support rib 12 is configured to support the end insulating plate 1, and in a direction perpendicular to the bottom surface of the end insulating plate 1, the glue baffle 11 in the second state does not exceed a bottom surface of the support rib 12. In the disclosure, the bottom surface of the end insulating plate 1 and the bottom surface of the support rib 12 both refer to the surface adjacent to the bottom plate of the case body.

To be specific, in the second state, if the glue baffle 11 exceeds the bottom surface of the support rib 12, the supporting and positioning of the end insulating plate 1 may be affected. In this embodiment, the glue baffle 11 in the second state does not exceed the bottom surface of the support rib 12, support and positioning effect of the end insulating plate 1 is ensured.

To be specific, the glue baffle 11 is approximately perpendicular to the first larger surface 10 when being in the second state. A thickness of the glue baffle 11 may be configured to be less than a height of the support rib 12, so as to ensure that, when the battery apparatus 2 is assembled in place, the glue baffle 11 may be completely accommodated within the support rib 12 and may not exceed the bottom surface of the support rib 12. The supporting and positioning of the end insulating plate 1 are thereby prevented from being affected, and the thinner glue baffle 11 may be easily bent.

In some embodiments, as shown in FIG. 6 and FIG. 7, a root portion of the glue baffle 11 is provided with a thinner portion 111 to facilitate bending of the glue baffle 11.

To be specific, the glue baffle 11 is a plate structure extending from the lower part of the main body portion of the end insulating plate 1. The root portion of the glue baffle 11 is the portion where the glue baffle 11 is connected to the main body portion of the end insulating plate 1. The root portion of the glue baffle 11 is weaker and may be easily deformed by force. The glue baffle 11 may be bent with its root portion as a rotation axis, so as to change between the first state and the second state.

Exemplarily, a length direction of the glue baffle 11 is defined from the root portion to an end of the glue baffle 11 away from the root portion, and a length d of the glue baffle 11 is less than or equal to a distance between the root portion of the glue baffle 11 and the first larger surface 10.

Preferably, the length d of the glue baffle 11 is less than the distance between the root portion of the glue baffle 11 and the first larger surface 10, and is greater than a distance between the root portion of the glue baffle 11 and a bottom wall of the glue overflowing groove 14.

If the glue baffle 11 is excessively long, irregular bending may occur during assembly, or the glue baffle 11 may be easily interfered and bends prematurely. As such, the effects of glue baffling and glue overflowing are affected, and the yield of the product is also affected. By configuring the length d of the glue baffle 11 to be less than or equal to the distance between the root portion of the glue baffle 11 and the first larger surface 10, irregular bending or premature bending during assembly may be avoided, so as to ensure that only when the glue baffle 11 abuts against the bottom plate 32, the glue baffle 11 bends from the first state to the second state, and the effects of glue baffling and glue overflowing are provided. Further, the glue baffle 11 is prevented from being broken due to excessive length, and the overall strength of the end insulating plate 1 is also insured. Besides, by configuring the length d of the glue baffle 11 to be greater than the distance between the root portion of the glue baffle 11 and the bottom wall of the glue overflowing groove 14, the glue may be easily pushed into the glue overflowing groove 14 when the glue baffle 11 bends, and the pressing and overflowing effects are thus improved.

Exemplarily, the thickness of the end insulating plate 1 is approximately 1 cm. The length d of the glue baffle 11 may be 2 mm to 7 mm, for example, the length d may specifically be 2 mm, 4 mm, 6 mm, and 7 mm.

In some embodiments, as shown in FIG. 3, the glue baffle 11 is an entire strip-shaped plate arranged on the bottom portion of the end insulating plate 1, and the strip-shaped plate extends in the length direction of the bottom surface of the end insulating plate 1. Compared to the arrangement of a plurality of plate bodies arranged at intervals, the entire strip-shaped plate may provide improved glue baffling and glue overflowing effects, and the gluing effect between the end insulating plate 1 and the beam may also be enhanced.

In some embodiments, as shown in FIG. 4 and FIG. 5, the bottom portion of the end insulating plate 1 is provided with a partition plate 15, and the partition plate 15 is arranged at a side of the glue baffle 11 away from the first larger surface 10.

To be specific, the partition plate 15 is configured to separate the glue baffle 11 from the batteries. On one hand, the glue baffle 11 may be prevented from being bent towards the battery side, and on the other hand, when the glue baffle 11 is broken, the broken glue baffle 11 may be prevented from entering a battery side region and affecting the yield of the battery apparatus.

To be specific, a height of the partition plate 15 is less than or equal to the height of the support rib 12, and is less than or equal to a depth of the first groove 13, so that the supporting function of the support rib 12 and/or the side wall of the first groove 13 is not affected.

Exemplarily, as shown in FIG. 2 and FIG. 3, a side of the first larger surface of the end insulating plate 1 may also be provided with a second groove 16 for accommodating a cantilever of a clamping tool, so as to facilitate clamping and transferring of the battery apparatus 2 by the clamping tool. The end insulating plate 1 may further be provided with a detection groove 17 on the side of the first larger surface, and the amount of glue overflowing may be detected through the detection groove 17. For instance, a slender detection rod or detection strip may be inserted into the detection groove 17 to detect whether the amount of glue overflowing meets design needs, the measurement principle may be similar to that of an oil dipstick.

In the second aspect, the disclosure further provides a battery device. As shown in FIG. 9, FIG. 10, and FIG. 11, the battery device includes a beam 31, a battery apparatus 2, and the end insulating plate 1 according to any one of the above. To be specific, the beam 31 forms a chamber, the end insulating plate 1 and the battery apparatus 2 are arranged in the chamber. The end insulating plate 1 is arranged between the beam 31 and the battery apparatus 2, and the first larger surface 10 of the end insulating plate 1 faces the beam 31. The glue baffle 11 of the end insulating plate 1 is in the second state.

In the battery device provided by this embodiment, the bottom portion of the end insulating plate 1 is provided with the glue baffle 11. During the process of assembling the end insulating plate 1 and the battery apparatus 2 to the case body 3 of the battery device, the glue baffle 11 may be bent, so that the glue 4 at the corner of the beam 31 and the bottom plate 32 of the case body 3 may be pressed between the end insulating plate 1 and the beam 31. In this way, the glue 4 is pressed and overflows, so that improved gluing strength is provided after the glue 4 is coated and cured, and an improved gluing effect is provided between the end insulating plate 1 and the beam 31. Further, since the glue 4 is directionally driven by the glue baffle 11, the glue 4 may not overflow easily or may not be scratched off and glued to other positions. Therefore, the amount of the glue which is actually applied may be prevented from being reduced, and the assembly yield of the battery device is prevented from being affected. In view of the foregoing, in the battery device provided by the disclosure, an improved gluing effect is provided between the end insulating plate 1 and the beam 31, and the assembly yield of the battery device is increased, which is beneficial to industrial production.

In some embodiments, the battery device provided by the disclosure further includes the glue layer extending from the bottom portion of the end insulating plate 1 to the first larger surface 10. That is, the glue on the bottom portion of the end insulating plate 1 is pressed and extends between the beam 31 and the end insulating plate 1 to form the glue layer.

In this embodiment, the glue layer between the beam 31 and the end insulating plate 1 overflows upwards along the first larger surface 10 from the bottom portion of the end insulating plate 1, instead of being coated on the entire first larger surface 10. Therefore, the glue layer is only located in a region near the bottom portion of the end insulating plate 1 and may not be scratched off and glued to other positions, and improved assembly yield is thereby provided.

Exemplarily, as shown in FIG. 4 and FIG. 5, when the first larger surface 10 of the end insulating plate 1 is provided with the glue overflowing groove 14, the glue overflowing groove 14 is a glue overflowing region. The glue layer is located in the glue overflowing groove 14, and the glue layer is provided between the glue overflowing groove 14 and the beam 31.

In some embodiments, as shown in FIG. 5 and FIG. 7, in the case body of the battery device, the glue baffle 11 of the end insulating plate 1 is in the second state and is generally arranged in parallel with the bottom plate 32 of the case body. Each of the side of the glue baffle 11 away from the bottom plate 32 of the case body of the battery device and the side adjacent to the bottom plate 32 of the case body of the battery device is provided with the glue layer. In this way, a gluing area between the bottom portion of the end insulating plate 1 and the bottom plate 32 of the case body may be increased, and the fixed yield of the end insulating plate 1, the battery apparatus, and the case body may be improved.

Figure 12:
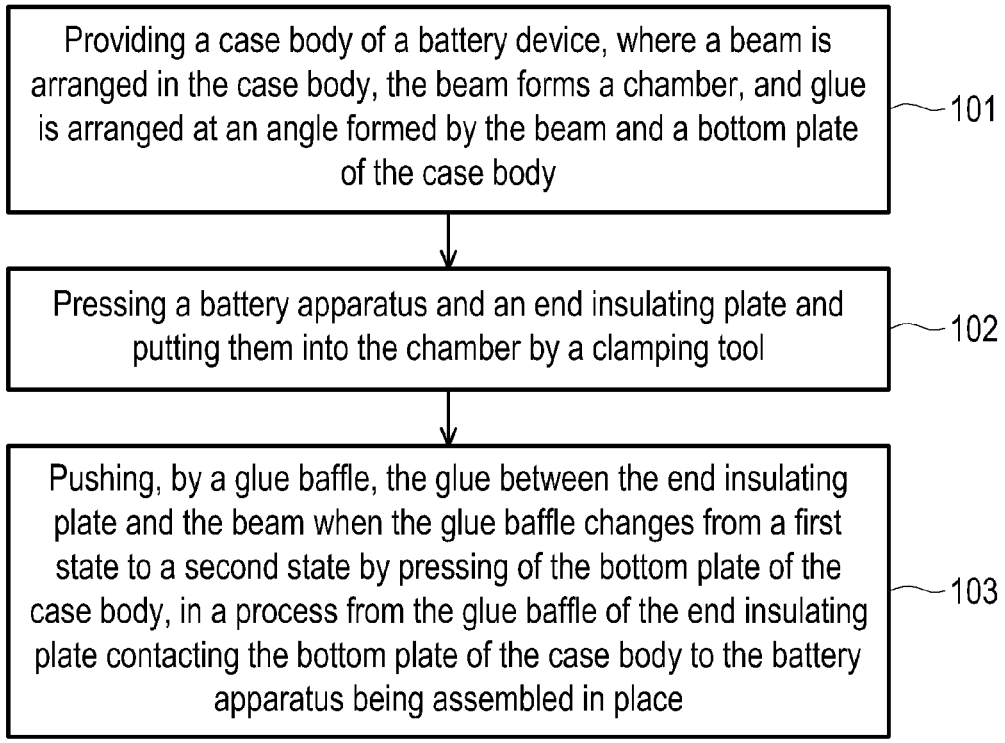
FIG. 12 is a flow chart of an assembling method of a battery device according to an embodiment of the disclosure.

In the third aspect, the disclosure further provides an assembling method of a battery device. As shown in FIG. 12, the method includes the following steps.

In step 101, the case body 3 of the battery device is provided. As shown in FIG. 9, the beam 31 is arranged in the case body 3, the beam 31 forms the chamber, and the glue 4 is arranged at the angle formed by the beam 31 and the bottom plate 32 of the case body 3.

In step 102, as shown in FIG. 10, a clamping tool tightly presses the battery apparatus 2 and the end insulating plate 1, and then puts them into the chamber. The end insulating plate 1 is arranged between the beam 31 and the battery apparatus 2, and the first larger surface 10 of the end insulating plate 1 faces the beam 31. As shown in FIG. 6 and FIG. 7, the bottom portion of the end insulating plate 1 is provided with the glue baffle 11. The glue baffle 11 is bendable and at least has the first state and the second state. In the first state and the second state, the glue baffle 11 is bent towards the first larger surface 10 of the end insulating plate 1. In the first state, the glue baffle 11 is bent at the first inclination angle θ relative to the first larger surface of the end insulating plate 1. In the second state, the glue baffle 11 is bent at the second inclination angle λ relative to the first larger surface of the end insulating plate 1. The first inclination angle θ is greater than the second inclination angle λ.

In step 103, as shown in FIG. 10 and FIG. 11, in the process from the glue baffle 11 of the end insulating plate 1 contacting the bottom plate 32 of the case body 3 to the battery apparatus 2 being assembled in place, the glue baffle 11 is abutted by the bottom plate 32 of the case body, and changes from the first state to the second state, so as to push the glue 4 between the end insulating plate 1 and the beam 31.

In the assembling method of the battery device provided by the present embodiment, the gluing strength between the beam and the battery apparatus may be strengthened by glue pressing and glue overflowing instead of glue coating. Further, the situation in which the battery apparatus may not be easily assembled in place due to the large coating area is prevented from occurring, the glue is also prevented from being scratched off and glued to other positions, so that the assembly yield of the battery device is improved. Further, the assembling method further improves the feasibility of the process and may improve the production efficiency.

In some embodiments, as shown in FIG. 4 and FIG. 5, the end insulating plate 1 is provided with the glue overflowing groove 14 arranged at a side of the first larger surface 10. The glue overflowing groove 14 is adjacent to the bottom portion of the end insulating plate 1, and a side of the glue overflowing groove 14 facing the bottom portion of the end insulating plate 1 has an opening.

In step 103, the step in which the glue baffle 11 pushes the glue 4 between the end insulating plate 1 and the beam 31 specifically includes the following: the glue baffle 11 pushes the glue 4 between the glue overflowing groove 14 and the beam 31.

To be specific, the battery device and the assembling method of the battery device provided by the disclosure have the same inventive concept as the end insulating plate provided by the disclosure and have the same embodiments and beneficial effects, and description thereof is not repeated herein in the disclosure.

To be specific, the battery device provided in this embodiment may be a battery pack or a large module. For example, in the case of a large module, the partition plate between the side plate of the module and the battery accommodating chamber is the beam. The bottom plate of the case body of the battery device may include a liquid cooling plate and/or a bottom shield.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. An end insulating plate, adapted to be arranged in a battery device to insulate a battery apparatus from other components, the end insulating plate comprising a glue baffle disposed at a bottom portion of the end insulating plate,
    wherein the glue baffle is bendable and at least has a first state and a second state, in the first state and the second state, the glue baffle is bent towards a side of a first larger surface of the end insulating plate, the first larger surface is a larger surface at a side of the end insulating plate facing away from the battery apparatus,
    in the first state, the glue baffle is bent at a first inclination angle relative to the first larger surface of the end insulating plate, in the second state, the glue baffle is bent at a second inclination angle relative to the first larger surface of the end insulating plate, the first inclination angle is greater than the second inclination angle, and when bending of the glue baffle is changed from the first inclination angle to the second inclination angle, the glue baffle is configured to push glue on the bottom portion of the end insulating plate in a direction away from the bottom portion of the end insulating plate.

2. The end insulating plate according to claim 1, wherein the first inclination angle ranges from 135° to 170°, and the second inclination angle is 85° to 95°.

3. The end insulating plate according to claim 2, wherein the first inclination angle ranges from 140° to 160°.

4. The end insulating plate according to claim 1, wherein the bottom portion of the end insulating plate is provided with a first groove, the glue baffle is arranged in the first groove, and the first groove is configured to accommodate the glue baffle in the second state.

5. The end insulating plate according to claim 1, wherein the glue baffle comprises a plurality of plate bodies arranged at intervals, and a support rib is arranged between adjacent plate bodies.

6. The end insulating plate according to claim 5, wherein the support rib is configured to support the end insulating plate, and in a direction perpendicular to a bottom surface of the end insulating plate, the glue baffle in the second state does not exceed a bottom surface of the support rib.

7. The end insulating plate according to claim 5, wherein a bottom portion of the support rib is provided with two first chamfers respectively facing the adjacent plate bodies at two sides.

8. The end insulating plate according to claim 7, wherein a side edge of each plate body adjacent to the support rib is provided with a second chamfer matched with a respective one of the first chamfers of the support rib.

9. The end insulating plate according to claim 1, wherein the glue baffle is an entire strip-shaped plate arranged on the bottom portion of the end insulating plate.

10. The end insulating plate according to claim 1, wherein a root portion of the glue baffle is provided with a thinner portion, and the root portion is a portion where the glue baffle is connected to a main body portion of the end insulating plate.

11. The end insulating plate according to claim 10, wherein a length direction of the glue baffle is defined as a direction from the root portion of the glue baffle to an end of the glue baffle away from the root portion, and a length of the glue baffle is less than or equal to a distance between the root portion of the glue baffle and the first larger surface.

12. The end insulating plate according to claim 10, wherein the end insulating plate is provided with a glue overflowing groove arranged at the side of the first larger surface, the glue overflowing groove is adjacent to the bottom portion of the end insulating plate, and a side of the glue overflowing groove facing the bottom portion of the end insulating plate has an opening, and the glue baffle is configured to push the glue towards the opening.

13. The end insulating plate according to claim 12, wherein a length direction of the glue baffle is defined as a direction from the root portion of the glue baffle to an end of the glue baffle away from the root portion, the root portion is a portion where the glue baffle is connected to a main body portion of the end insulating plate, and a length of the glue baffle is less than a distance between the root portion of the glue baffle and the first larger surface, and is greater than a distance between the root portion of the glue baffle and a bottom wall of the glue overflowing groove.

14. The end insulating plate according to claim 12, wherein a support rib is arranged at the bottom portion of the end insulating plate, and the support rib extends in the glue overflowing groove.

15. The end insulating plate according to claim 11, wherein the length of the glue baffle ranges from 2 mm to 7 mm.

16. The end insulating plate according to claim 1, wherein the bottom portion of the end insulating plate is provided with a partition plate, and the partition plate is arranged at a side of the glue baffle away from the first larger surface.

17. A battery device, comprising a beam, a battery apparatus, and the end insulating plate according to claim 1, wherein the beam forms a chamber, the end insulating plate and the battery apparatus are arranged in the chamber, the end insulating plate is arranged between the beam and the battery apparatus, the first larger surface of the end insulating plate faces the beam, and the glue baffle is in the second state.

18. The battery device according to claim 17, further comprising: a glue layer extending from the bottom portion of the end insulating plate onto the first larger surface.

19. The battery device according to claim 17, wherein the end insulating plate is provided with a glue overflowing groove arranged at the side of the first larger surface, and a glue layer is provided between the glue overflowing groove and the beam.

20. The battery device according to claim 17, wherein each of a side of the glue baffle away from a bottom plate of a case body of the battery device and a side adjacent to the bottom plate of the case body of the battery device is provided with a glue layer.

21. An assembling method of a battery device, comprising:
providing a case body of the battery device, wherein a beam is arranged in the case body, the beam forms a chamber, and glue is arranged at an angle formed by the beam and a bottom plate of the case body;
pressing a battery apparatus and an end insulating plate and putting the battery apparatus and the end insulating plate into the chamber by a clamping tool, wherein the end insulating plate is arranged between the beam and the battery apparatus, a first larger surface of the end insulating plate faces the beam, a bottom portion of the end insulating plate is provided with a glue baffle, and the glue baffle is bendable and at least has a first state and a second state, in the first state and the second state, the glue baffle is bent towards the first larger surface of the end insulating plate, in the first state, the glue baffle is bent at a first inclination angle relative to the first larger surface of the end insulating plate, in the second state, the glue baffle is bent at a second inclination angle relative to the first larger surface of the end insulating plate, and the first inclination angle is greater than the second inclination angle; and
pushing, by the glue baffle, the glue between the end insulating plate and the beam when the glue baffle changes from the first state to the second state by pressing of the bottom plate of the case body, in a process from the glue baffle of the end insulating plate contacting the bottom plate of the case body to the battery apparatus being assembled in place.

22. The assembling method of the battery device according to claim 21, wherein the end insulating plate is provided with a glue overflowing groove arranged at a side of the first larger surface, and the glue overflowing groove is adjacent to the bottom portion of the end insulating plate, and a side of the glue overflowing groove facing the bottom portion of the end insulating plate has an opening, and
the step of pushing, by the glue baffle, the glue between the end insulating plate and the beam includes: pushing, by the glue baffle, the glue between the glue overflowing groove and the beam.

* * * * *